US008307695B2

(12) United States Patent
Miyaura et al.

(10) Patent No.: US 8,307,695 B2
(45) Date of Patent: Nov. 13, 2012

(54) CETANE NUMBER ESTIMATION METHOD

(75) Inventors: Takeshi Miyaura, Toyota (JP);
Yasuyuki Terada, Toyota (JP); Akio Matsunaga, Nishikamo-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 253 days.

(21) Appl. No.: 12/678,828

(22) PCT Filed: Feb. 5, 2009

(86) PCT No.: PCT/IB2009/000206
§ 371 (c)(1),
(2), (4) Date: Mar. 18, 2010

(87) PCT Pub. No.: WO2009/112907
PCT Pub. Date: Sep. 17, 2009

(65) Prior Publication Data
US 2010/0319444 A1 Dec. 23, 2010

(30) Foreign Application Priority Data
Mar. 13, 2008 (JP) ................................ 2008-064311

(51) Int. Cl.
*G01M 15/00* (2006.01)
(52) U.S. Cl. .................. 73/35.02; 73/114.38; 73/114.55
(58) Field of Classification Search ................. 73/35.02, 73/114.38, 114.55
See application file for complete search history.

(56) References Cited

U.S. PATENT DOCUMENTS

| 5,457,985 | A | * | 10/1995 | Cellier et al. ................. 73/35.02 |
| 6,609,413 | B1 | * | 8/2003 | De Craecker ................. 73/35.02 |
| 6,947,830 | B1 | | 9/2005 | Froloff et al. |
| 7,027,906 | B2 | * | 4/2006 | Araki ............................. 701/104 |
| 7,028,532 | B2 | * | 4/2006 | Shinzawa ..................... 73/35.02 |
| 7,289,900 | B2 | * | 10/2007 | Wilharm et al. ............... 701/103 |
| 7,926,331 | B2 | * | 4/2011 | Tsutsumi et al. ........... 73/114.38 |
| 8,060,292 | B2 | * | 11/2011 | Takahashi et al. ............ 701/104 |
| 8,185,293 | B2 | * | 5/2012 | Jiang et al. ..................... 701/102 |
| 2004/0261414 | A1 | | 12/2004 | Araki |
| 2008/0120013 | A1 | * | 5/2008 | Yamaguchi et al. .......... 701/103 |

FOREIGN PATENT DOCUMENTS

| EP | 1 923 557 A1 | 5/2008 |
| FR | 2 916 243 A3 | 11/2008 |
| JP | 2001-152948 A | 6/2001 |
| JP | 2004-340026 A | 12/2004 |
| JP | 2005-036788 A | 2/2005 |
| JP | 2005-344557 A | 12/2005 |
| JP | 2007-154699 A | 6/2007 |
| WO | 2006/041867 A2 | 4/2006 |

* cited by examiner

*Primary Examiner* — Freddie Kirkland, III
(74) *Attorney, Agent, or Firm* — Sughrue Mion, PLLC

(57) ABSTRACT

A cetane number estimation method is provided in which: the preliminary injection is preformed multiple times at different compression end temperatures with a fuel tank (26) containing fuel having a predetermined cetane number, and an engine torque increase caused by each preliminary injection is calculated and the relation between the compression end temperatures at the respective preliminary injections and the engine torque increases caused by the respective preliminary injections is determined; the compression end temperature and the engine torque increase at a predetermined reference point on the relation are recorded as a basic compression eng temperature and a basic engine toque increase; the preliminary injection is performed at the basic compression end temperature and an engine torque increase caused by this preliminary injection is calculated; and the cetane number of fuel is estimated based on the relation between the calculated engine torque increase and the basic engine torque increase.

20 Claims, 8 Drawing Sheets

FIG.9A

CORRECTION VALUE FOR TARGET INJECTION TIMING Tm

| CETANE NUMBER | SMALL ⇔ LARGE |
|---|---|
| CORRECTION VALUE | ADVANCING DEGREE  LARGE ⇔ SMALL |

FIG.9B

CORRECTION VALUE FOR TARGET PILOT INJECTION AMOUNT Qpi

| CETANE NUMBER | SMALL ⇔ LARGE |
|---|---|
| CORRECTION VALUE | INCREASING DEGREE  LARGE ⇔ SMALL |

FIG.9C

CORRECTION VALUE FOR PILOT INTERVAL INTp

| CETANE NUMBER | SMALL ⇔ IARGE |
|---|---|
| CORRECTION VALUE | SHORTENING DEGREE  LARGE ⇔ SMALL |

FIG.9D

CORRECTION VALUE FOR TARGET RAIL PRESSURE Tpr

| CETANE NUMBER | SMALL ⇔ LARGE |
|---|---|
| CORRECTION VALUE | INCREASING DEGREE  LARGE ⇔ SMALL |

FIG.9E

CORRECTION VALUE FOR TARGET EGR RATE Tegr

| CETANE NUMBER | SMALL ⇔ LARGE |
|---|---|
| CORRECTION VALUE | REDUCING DEGREE  LARGE ⇔ SMALL |

CETANE NUMBER ESTIMATION METHOD

BACKGROUND OF THE INVENTION

1. Field of the Invention

The invention relates to a cetane number estimation method for estimating the cetane number of diesel engine fuels.

2. Description of the Related Art

In diesel engines, compression ignition of fuel injected from each fuel injection valve occurs a certain time after the injection, that is, there is a so-called ignition delay before the injected fuel is ignited. In order to improve the output performance of diesel engines and reduce the emissions from them, control apparatuses that control the operation parameters for controlling the diesel engine, such as the fuel injection timing and the fuel injection amount, in consideration of the ignition delays are widely used (Refer to Japanese Patent Application Publication. No. 2001-152948 (JP-A-2001-152948).

Meanwhile, the smaller the cetane number of the fuel used in a diesel engine, the longer the ignition delays. Therefore, in a case where the operation parameters for the engine control are set for fuel having a standard cetane number, for example, if the fuel tank is refueled with fuel having a cetane number smaller than the standard cetane number, such as winter fuel, the ignition timing of the fuel is further delayed and the combustion state deteriorates, causing misfires in some cases.

This problem can be prevented by correcting the operation parameters for controlling the engine operation based on the cetane number of the fuel actually injected into the combustion chambers. To perform such correction properly, the cetane number of fuel needs to be accurately estimated.

SUMMARY OF THE INVENTION

The invention provides a cetane number estimation method that enables accurate estimation of the cetane number of fuel.

The first aspect of the invention relates to a cetane number estimation method for estimating a cetane number of fuel combusted in a diesel engine in which a regular injection is performed by injecting fuel of an amount corresponding to an engine operation state and a preliminary injection is performed by injecting fuel of an amount predetermined for estimation of the cetane number of fuel. This cetane number estimation method includes: a first process in which the preliminary injection is preformed multiple times at different compression end temperatures with a fuel tank containing fuel having a predetermined cetane number, and an engine torque increase that has been caused by each preliminary injection is calculated and the relation between the compression end temperatures at the respective preliminary injections and the engine torque increases caused by the respective preliminary injections is determined, and the compression end temperature and the engine torque increase at a predetermined reference point on the relation are recorded in a data storage; a second process in which the preliminary injection is performed at the compression end temperature recorded in the data storage and an engine torque increase caused by the preliminary injection is calculated; and a third process in which a cetane number of fuel is estimated based on a relation between the engine torque increase recorded in the data storage and the engine torque increase calculated in the second process.

The second aspect of the invention relates a cetane number estimation method for estimating a cetane number of fuel combusted in a diesel engine in which a regular injection is performed by injecting fuel of an amount corresponding to an engine operation state and a preliminary injection is performed by injecting fuel of an amount predetermined for estimation of the cetane number of fuel. The cetane number estimation method includes: a first process in which the preliminary injection is preformed multiple times at different compression end temperatures with a fuel tank containing fuel having a predetermined cetane number, and an increase in the rotation speed of an engine output shaft that has been caused by each preliminary injection is calculated and a relation between the compression end temperatures at the respective preliminary injections and the engine output shaft speed increases caused by the respective preliminary injections is determined, and the compression end temperature and the engine output shaft speed increase at a predetermined reference point on the relation are recorded in a data storage; a second process in which the preliminary injection is performed at the compression end temperature recorded in the data storage and an engine output shaft speed increase caused by the preliminary injection is calculated; and a third process in which a cetane number of fuel is estimated based on a relation between the engine output shaft speed increase recorded in the data storage and the engine output shaft speed increase calculated in the second process.

In diesel engines, the smaller the cetane number of fuel, the smaller the increase in the engine torque and the increase in the engine speed caused by injecting a constant amount of the fuel.

According to the cetane number estimation methods of the first and second aspects of the invention, the engine torque increase (or the engine output shaft speed increase) caused by injecting the fuel having a predetermined cetane number is obtained and then recorded in the data storage in the first process. Then, in the second process, the engine torque increase (or the engine output shaft speed increase) caused by injecting the fuel stored in the fuel at this time is obtained. Then, the cetane number of the fuel stored in the fuel tank at this time is estimated based on the relation between the increase recorded in the first process (the increase corresponding to the predetermined cetane number) and the increase calculated in the second process (the increase corresponding to the cetane number of the fuel stored in the fuel tank at this time).

Even if the preliminary injection is performed by injecting a constant amount of fuel, the engine toque increase (or the engine output shaft speed increase) caused by the preliminary injection varies depending upon the individual specificity of the diesel engine, such as that of its fuel supply system, and such variation may cause an error in the cetane number estimation. In diesel engines, the lower the compression end temperature, the smaller the increase in the engine torque and the increase in the engine output shaft speed caused by fuel injection provided that the amount of injected fuel is constant. Note that "compression end temperature" represents the temperature in each combustion chamber when the piston is at the top dead center on compression stroke with no fuel injected therein.

In view of the above, in the cetane number estimation methods of the first and second aspects of the invention, in the first process, the preliminary injection is performed multiple times at different compression end temperatures and the relation between the compression end temperatures at the respective preliminary injections and the engine torque increases (or the engine output shaft speed increases) caused by the respective preliminary injections is determined, and the engine torque increase (or the engine output shaft speed increase) at the reference point on the determined relation, that is, the point appropriate for the cetane number estimation, is recoded in the data storage as a reference value to be compared with the engine torque increase (or the engine output shaft speed increase) that will be calculated in the second process.

According to the cetane number estimation methods of the first and second aspects of the invention, as such, the value of the engine torque increase (or the engine output shaft speed increase) reflecting the individual specificity of the diesel engine and appropriate for the cetane number estimation is determined and recorded in the first process, and then, in the second process, the cetane number of fuel stored in the fuel tank at this time can be accurately estimated based on the recorded engine torque increase (or the recorded engine output shaft speed increase).

The cetane number estimation method of the first aspect of the invention may be such that, in the first process, the compression end temperature at which misfires start to occur is estimated based on the tendency of change in the engine torque increase with respect to a change in the compression end temperature from one side to the other side of the relation, and the point corresponding to the estimated compression end temperature is set as the reference point.

On the relation determined in the first process of the cetane number estimation method of the first aspect of the invention, the engine torque increase tends to decrease significantly at the point at which misfires start to occur as the compressions end temperature decreases.

Thus, in the cetane number estimation method of the first aspect of the invention, the point at which misfires start to occur, that is, the reference point can be accurately estimated based on the tendency of change in the engine torque increase with respect to a change in the compression end temperature from one side to the other side of the relation, and therefore the compression end temperature and the engine torque increase at this reference point are appropriate.

Further, the cetane number estimation method of the first aspect of the invention may be such that, in the first process, the compression end temperature at which the engine torque increase changes sharply is determined as the compression end temperature at which misfires start to occur.

In this, the compression end temperature at which misfires start to occur can be accurately estimated.

The cetane number estimation method of the second aspect of the invention may be such that, in the first process, the compression end temperature at which misfires start to occur is estimated based on the tendency of change in the engine output shaft speed increase with respect to a change in the compression end temperature from one side to the other side of the relation and the point corresponding to the estimated compression end temperature is set as the reference point.

On the relation determined in the first process of the cetane number estimation method of the second aspect of the invention, the engine output shaft speed increase tends to decrease significantly at the point at which misfires start to occur as the compressions end temperature decreases.

As such, in the cetane number estimation method of the second aspect of the invention, thus, the point at which misfires start to occur, that is, the reference point can be accurately estimated based on the tendency of change in the engine output shaft speed increase with respect to a change in the compression end temperature from one side to the other side of the relation, and therefore the compression end temperature and the engine output shaft speed increase at this reference point are appropriate.

Further, the cetane number estimation method of the second aspect of the invention may be such that, in the first process, the compression end temperature at which the engine output shaft speed increase changes sharply is determined as the compression end temperature at which misfires start to occur.

In this case, the compression end temperature at which misfires start to occur can be accurately estimated.

The cetane number estimation methods of the first and second aspects of the invention may be such that the first process is executed before the diesel engine is shipped out of a factory.

In this case, the cetane number of fuel can be accurately estimated after the diesel engine is shipped out of the factory.

The cetane number estimation methods of the first and second aspects of the invention may be such that the second process is executed on the condition that the fuel tank has been refueled after the preliminary injection was performed last time.

In this case, the cetane number estimation is performed only when there is a possibility that the cetane number of the fuel in the tank has changed, and therefore the cetane number estimation can be performed efficiently.

The cetane number estimation methods of the first and second aspects of the invention may be such that the second process is executed each time the diesel engine is started.

Further, the cetane number estimation methods of the first and second aspects of the invention may be such that the first process and the second process are executed in a state where the regular injection is suspended.

In this case, the first process and the second process can be executed without being influenced by the regular injections, and therefore the engine torque increases (or the engine output shaft speed increases) caused by the preliminary injections can be accurately calculated.

The cetane number estimation methods of the first and second aspects of the invention may be such that the second process are executed in a state where the regular injection is suspended while the speed of the diesel engine is decreasing.

The cetane number estimation methods of the first and second aspects of the invention may be such that the first process and the second process are executed when an output shaft of the diesel engine and a driven shaft are disconnected from each other.

The cetane number estimation methods of the first and second aspects of the invention may be such that a drive-force transfer mechanism is provided between the engine output shaft and a driven shaft and is switched between a state where the degree of drive-force transfer between the engine output shaft and the driven shaft is large and a state where said degree is small and the first process and the second process are executed when the drive-force transfer mechanism is in the state where the degree of drive-force transfer between the engine output shaft and the driven shaft is small.

In this case, the first and second processes are executed in a state where the influence from the rotation of the driven shaft is small, and therefore the engine torque increases (or the engine output shaft speed increases) caused by the preliminary injections can be accurately calculated.

The drive-force transfer mechanism includes a clutch mechanism that connects the engine output shaft to the driven shaft and interrupts said connection as needed and a torque converter having a lock-up clutch that connects the engine output shaft to the driven shaft and interrupts said connection as needed.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein:

FIG. 9A to FIG. 9E are charts each schematically illustrating the relation between each control target value and its correction value according to the embodiment of the invention.

DETAILED DESCRIPTION OF THE EMBODIMENTS

Figure 1:
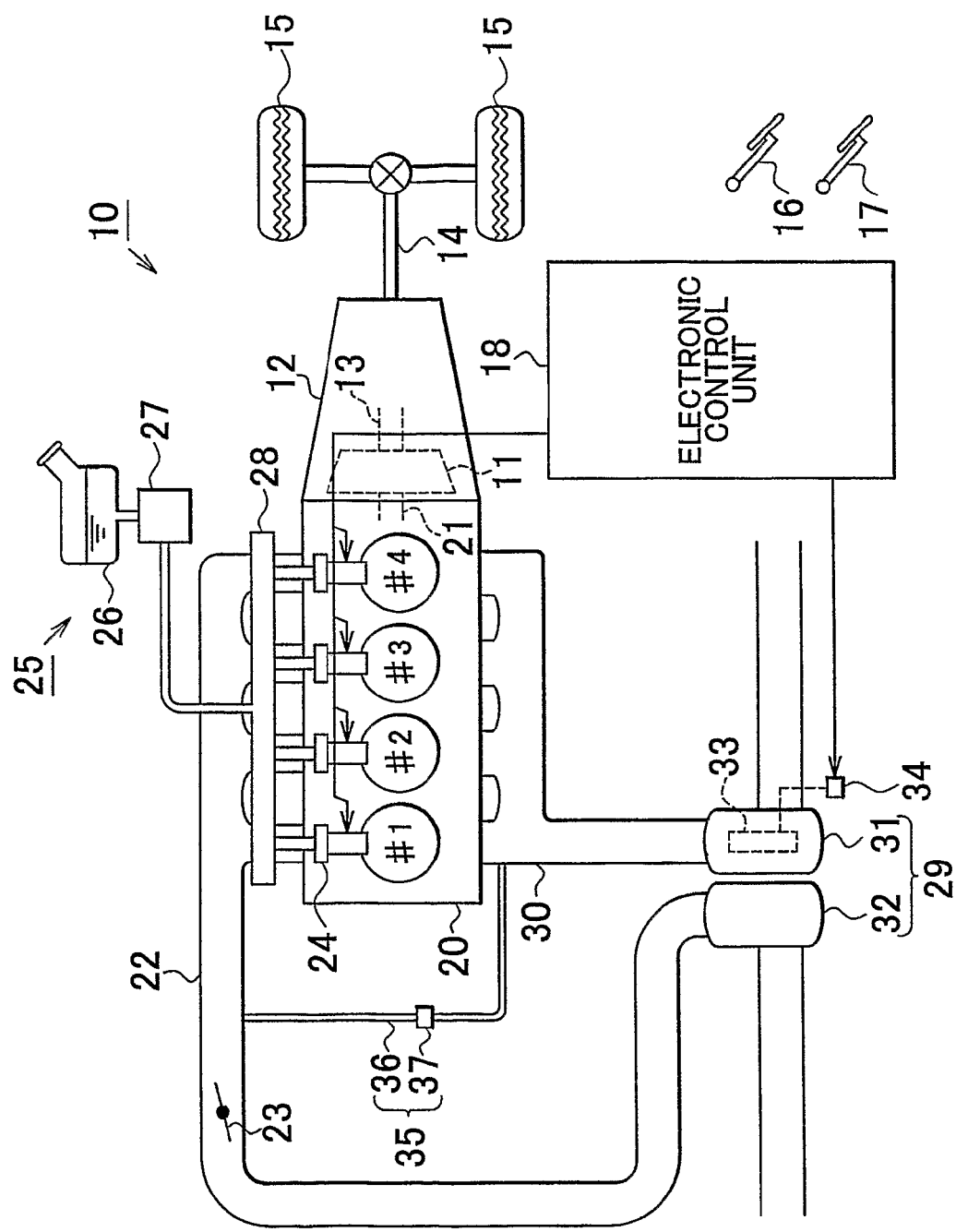
FIG. 1 is a view schematically showing the configuration of a vehicle in which a cetane number estimation method according to an embodiment of the invention is implemented.

A cetane number estimating method according to an example embodiment of the invention will be described. FIG. 1 schematically shows the configuration of a vehicle 10 using the cetane number estimating method of the example embodiment. Referring to FIG. 1, the vehicle 10 has a diesel engine 20 having four cylinders #1 to #4. An output shaft 21 of the diesel engine 20 is connected to drive wheels 15 via a clutch mechanism 11, a transmission 12, and a drive shaft 14. The clutch mechanism 11 is used to switch the state of coupling between the output shaft 21 of the diesel engine 20 and an input shaft 13 of the transmission 12 between a coupled state and a decoupled state. More specifically, when a clutch pedal 16 is not depressed, the output shaft 21 of the diesel engine 20 and the input shaft 13 of the transmission 12 are coupled with each other via the clutch mechanism 11, and as the clutch pedal 16 is depressed, the output shaft 21 of the diesel engine 20 is decoupled from the input shaft 13 of the transmission 12.

An intake throttle valve 23 is provided in an intake passage 22 of the diesel engine 20. The passage area in the intake passage 22 is changed by controlling the degree of opening of the intake throttle valve 23. Fuel injection valves 24 are provided in the diesel engine 20, and fuel is supplied to each fuel injection valve 24 from a fuel supply system 25. The fuel supply system 25 is constituted of a fuel tank 26 for storing fuel, a fuel pump 27 that delivers fuel from the fuel tank 26 at a high pressure, a delivery pipe 28 in which the high-pressure fuel sent from the fuel pump 27 is temporarily kept. The fuel injection valves 24 are connected to the delivery pipe 28 and driven to inject fuel directly into the respective cylinders (i.e., combustion chambers) of the diesel engine 20, and then the injected fuel is ignited through compression ignition.

The diesel engine 20 is provided with a turbocharger 29 that is driven by exhaust gas. A turbine 31 of the turbocharger 29 is provided in an exhaust passage 30 of the diesel engine 20 while a compressor 32 of the turbocharger 29 is provided in the intake passage 22 at a position upstream of the intake throttle valve 23. As exhaust gas passes through the inside of the turbine 31, a turbine wheel provided in the turbine 31, which is not shown in the drawings, rotates, whereby the air in the intake passage 22 is forcibly drawn into the respective cylinders of the diesel engine 20.

The turbocharger 29 is a variable-nozzle-vane type turbocharger. More specifically, the turbocharger 29 has a vane mechanism 33 that is used to adjust the flow rate of exhaust gas that hits the turbine wheel. The vane mechanism 33 has a plurality of nozzle vanes (not shown in the drawings) that are equiangularly arranged around the turbine wheel about the its axis. As the vane mechanism 33 is actuated by an actuator 34, the nozzle vanes are opened or closed in synchronization, whereby the intervals between the nozzle vanes change. As such, the flow rate of exhaust gas hitting the turbine wheel is adjusted, whereby the rotation speed of the turbine wheel adjusted, that is, the amount of air forcibly drawn into the respective cylinders of the diesel engine 20 is adjusted.

The diesel engine 20 is provided with an exhaust-gas recirculation system 35 (will hereinafter be referred to as "EGR system") that is used to return a portion of exhaust gas into intake air. The EGR system 35 is constituted of an EGR passage 36 extending between the intake passage 22 and the exhaust passage 30 and an EGR valve 37 provided in the EGR passage 36. The amount of exhaust gas drawn into the intake passage 22 from the exhaust passage 30 (will be referred to as "EGR amount") is adjusted by adjusting the degree of opening of the EGR valve 37.

Various sensors are provided in the vehicle 10 to detect the operation state of the vehicle 10, such as: an accelerator sensor for detecting an acceleration operation amount ACC of an accelerator pedal 17; a clutch sensor for detecting whether the clutch pedal 16 is being depressed; a vehicle speed sensor for detecting a running speed SPD of the vehicle 10; a fuel amount sensor for detecting the amount of fuel in the fuel tank 26; a rotation speed sensor for detecting the rotation speed of the output shaft 21 of the diesel engine 20 (rotation speed sensor NE), a pressure sensor for detecting the pressure of fuel in the delivery pipe 28 (rail pressure PR); a pressure sensor for detecting the pressure on the downstream side of the intake throttle valve 23 in the intake passage 22 (supercharging pressure PT); an intake amount sensor for detecting the amount of intake air drawn into the cylinders of the diesel engine 20 (intake amount GA), an oxygen sensor for detecting the oxygen concentration in exhaust gas; an opening sensor for detecting the opening degree of the intake throttle valve 23; and an opening sensor for detecting the opening degree of the EGR valve 37.

Further, the vehicle 10 is provided with an electronic control unit 18 that is constituted of, for example, a microcomputer device. The electronic control unit 18 obtains the output signals from various sensors and executes various computations and calculations. Based on the results of the computations and calculations, the electronic control unit 18 executes various vehicle and engine controls.

As one of such vehicle and engine controls, in the cetane number estimation method of the example embodiment, a supercharging pressure control is executed in which the supercharging pressure PT is adjusted based on the operation state of the diesel engine 20. In the supercharging pressure control, a control target value of the supercharging pressure PT (target supercharging pressure Tpt) is calculated based on the amount of fuel injected from the fuel injection valves 24 (the amount of fuel injected through the main fuel injections from the fuel injection valves 24, which will be described later) and the engine speed NE. Then, the intervals between the nozzle vanes are changed by the nozzle vanes being actuated by the actuator 34 such that the supercharging pressure PT equals the target supercharging pressure Tpt.

Further, the electronic control unit 18 also executes an EGR control for adjusting the EGR amount. In the EGR control, the EGR valve 37 and the intake throttle valve 23 are controlled based on the oxygen concentration in exhaust gas that is detected by the oxygen sensor. More specifically, in the EGR control, the present value of an EGR rate Er (the ratio between the EGR amount and the intake amount GA) is calculated from the air-fuel ratio of gas combusted in each cylinder of the diesel engine 20 (i.e., the oxygen concentration in exhaust gas that indicates said air-fuel ratio) and the intake amount GA, and a control target value of the EGR rate Er (target EGR rate Tegr) is calculated based on the amount of fuel injected from the fuel injection valves 24 (the amount of fuel injected through the main fuel injections from the fuel injection valves 24, which will be described later) and the engine speed NE. Then, the control target values of the opening degrees of the EGR valve 37 and the intake throttle valve 23 (target EGR valve opening degree and target throttle valve opening degree) are set to values required to bring the actual EGR rate Er to the target EGR rate Tegr, in other words, values required to adjust the EGR amount and the intake amount GA as needed to achieve the target EGR rate Tegr. Then, the EGR valve 37 is driven such that the actual EGR valve opening degree equals to the target EGR valve opening degree, and the intake throttle valve 23 is driven such that the accrual opening degree of the intake throttle valve 23 equals the target throttle valve opening degree.

In each combustion chamber, compression ignition of fuel occurs a certain time after its injection from the fuel injection valve 24. That is, there is an ignition delay before compression ignition of the injected fuel occurs. If the ignition delay is relatively long, it causes the entirety or majority of the injected fuel to be ignited at the same time, whereby the combustion pressure in the cylinder sharply increases, resulting in larger combustion noises and an increase in the emissions of nitrogen oxides (NOx).

In view of the above, in the cetane number estimation method of the example embodiment, a pilot injection is performed before the main injection from each fuel injection valve 24, that is, the injection for producing engine output, in order to shorten the ignition delay of the fuel injected through the main injection. The pilot injection is performed by injecting a small amount of fuel from the fuel injection valves 24. In the following, the main injection and the pilot injection will be correctively referred to as "regular injection" where necessary.

Figure 2:
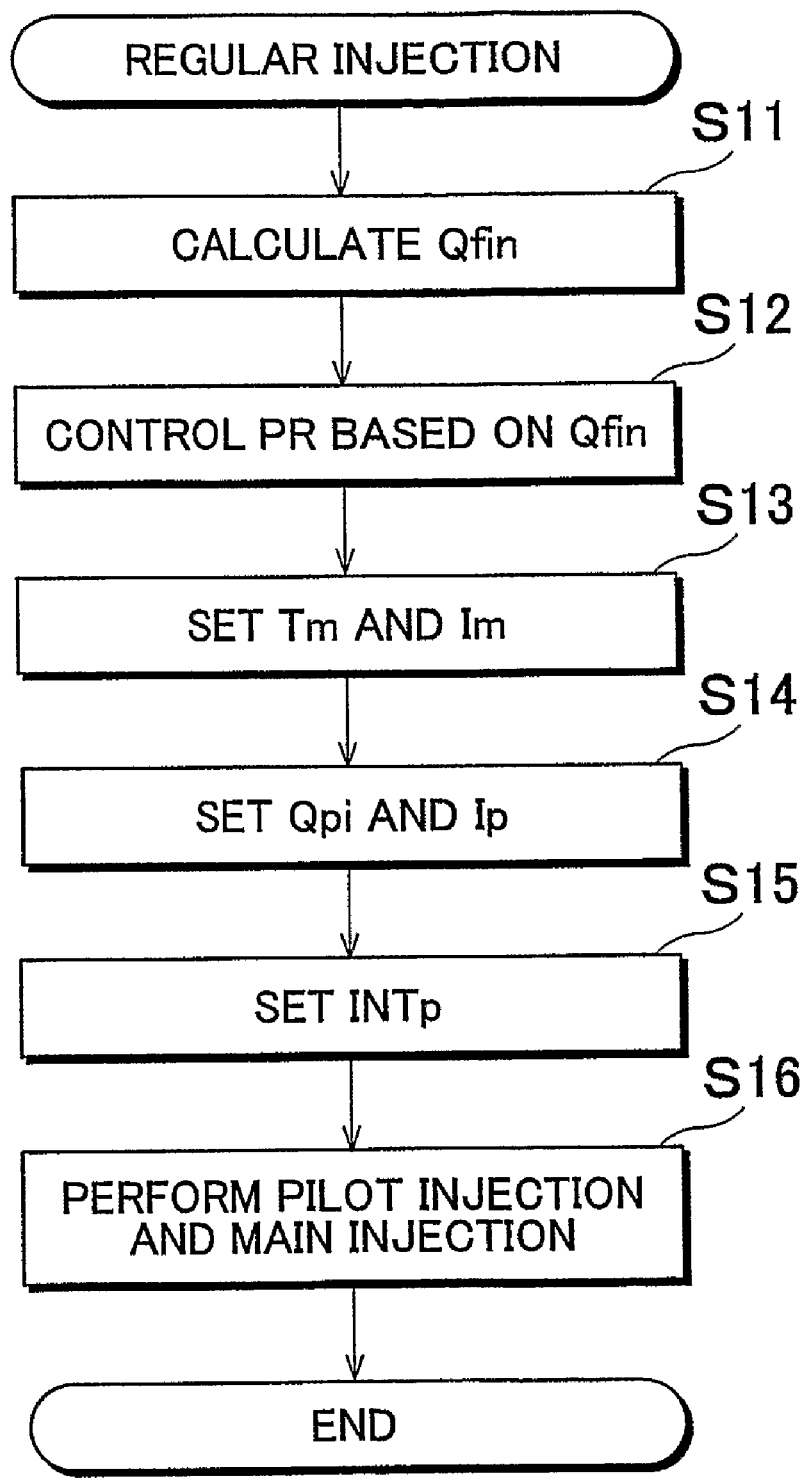
FIG. 2 is a flowchart illustrating the procedure for executing regular injections according to the embodiment of the invention.

The flowchart of FIG. 2 illustrates a routine for executing the regular injection from each fuel injection valve 24 (will be referred to as "regular fuel injection control"). Referring to FIG. 2, in the regular fuel injection control, a control target value of the fuel injection amount for the main injection (will be referred to as "target main injection amount Qfin") is calculated based on the operation amount ACC of the accelerator pedal 17 and the engine speed NE (step S11).

Then, a control target value of the rail pressure PR (will be referred to as "target rail pressure Tpr) is calculated based on the target main injection amount Qfin, and then the amount of fuel sent from the fuel pump 27 is adjusted by controlling the fuel pump 27 such that the actual rail pressure PR equals to the target rail pressure Tpr (step S12).

Then, based on the target main injection amount Qfin and the rail pressure PR, a target injection time Tm and a target injection duration Im for the main injections are set (step S13) and a control target value of the fuel injection amount for the pilot injection (will be referred to as "target pilot injection amount Qpi) and a target pilot injection duration Ip are set (step S14). Then, the interval between the pilot injection and the main injection (will be referred to as "pilot interval INTp") is set based on the target main injection amount Qfin (step S15).

Then, the pilot injection and the main injection are performed sequentially based on the control target values set as described above (step S16). At this time, more specifically, the pilot injection is performed based on the target pilot injection duration Ip and the pilot interval INTp, and the main injection is performed based on the target injection time Tm and the target injection duration Im.

Note that the aforementioned settings of the target main injection amount Qfin, the target rail pressure Tpr, the target injection time Tm, the target injection duration Im, the target pilot injection amount Qpi, the target pilot injection duration Ip, and the pilot interval INTp are separately performed using corresponding calculation maps. These calculation maps are empirically formulated and then stored in the electronic control unit 18.

Due to the pilot injection performed before the main injection, the ignition delay of fuel shortens, suppressing an increase in the combustion noise and an increase in the NOx emissions due to the ignition delay.

Meanwhile, the smaller the cetane number of the fuel used in the diesel engine 20, the longer the ignition delays. Therefore, in a case where the aforementioned calculation maps that are stored in the electronic control unit 18 and used to control execution of the regular fuel injections from the fuel injection valves 24 as described above are formulated for fuel having a standard cetane number, for example, if the fuel tank 26 is refueled with fuel having a cetane number smaller than the standard cetane number, such as winter fuel, the ignition timing of the fuel is delayed unnecessarily, which makes the combustion noise larger and increases the NOx emissions. Further, if the cetane number of the used fuel is very small, the ignition timing may be delayed to a time point much later than the top dead center. In this case, misfires may occur.

To prevent this, in the cetane number estimation method of the example embodiment, the cetane number of the fuel presently stored in the fuel tank 26, that is, the cetane number of the fuel combusted in the diesel engine 20 is estimated, and the above-described control target values for the regular fuel injection are corrected based on the estimated cetane number of the fuel.

The cetane number of fuel is estimated as follows. First, before factory shipment, fuel having a predetermined cetane number, which will be referred to as "reference fuel", is supplied into the fuel tank 26 and a small amount of the reference fuel is injected (preliminary injection is performed), and then the resultant increase in the toque of the diesel engine 20 (i.e., the rotational torque of the output shaft 21 of the diesel engine 20) is detected. After factory shipment, the fuel tank 26 is refueled, and a small of fuel is injected as the preliminary injection, and the resultant increase in the torque of the diesel engine 20 is detected. Then, the cetane number of the fuel presently in the fuel tank 26 is estimated based on the relation between the engine torque increase caused by injecting the reference fuel and the engine torque increase caused by injecting the fuel presently in the fuel tank 26.

Hereinafter, the process of the engine torque increase detection before factory shipment (will be referred to as "first process"), the process of the engine torque increase detection after factory shipment (will be referred to as "second process"), and the process of the cetane number estimation based on the engine torque increases (will be referred to as "third process") will be described in detail.

To begin with, a description will be made of, with reference to the flowchart of FIG. 3, a procedure including the first process and executed before factory shipment (will be referred to as "pre-shipment estimation procedure"). More specifically, before factory shipment of the vehicle 10, the reference fuel having a predetermined cetane number (e.g., 55) is supplied into the fuel tank 26, and an external device (not shown in the drawings) is connected to the vehicle 10, and the pre-shipment estimation procedure is implemented by operating the external device.

Figure 3:
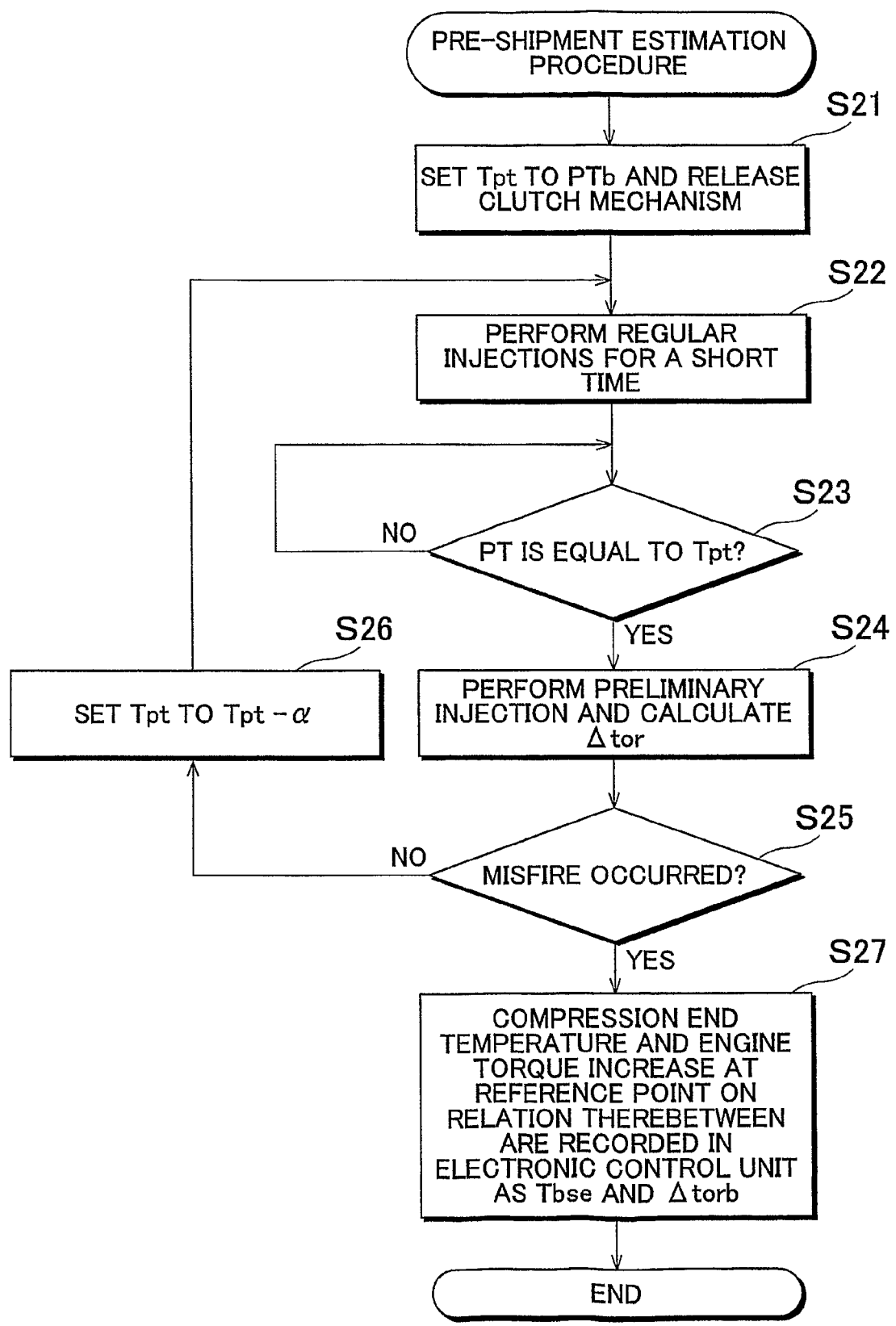
FIG. 3 is a flowchart illustrating a pre-shipment estimation procedure according to the embodiment of the invention.

Referring to FIG. 3, during the pre-shipment estimation procedure, first, the target supercharging pressure Tpt is set to a predetermined pressure PTb (step S21), and the clutch mechanism 11 is released. At this time, the target supercharging pressure Tpt is set so as to ensure that the temperature in the combustion chamber in each cylinder reaches a desired temperature when the piston is at the top dead center on compression stroke with no fuel injected into said combustion chamber. Note that the temperature in the combustion chamber when the piston is at the top dead center on compression stroke with no fuel injected, will be referred to as "compression-end temperature". The predetermined pressure PTb is empirically set such that the compression-end temperature increases up to a level at which no misfires occur when the aforementioned preliminary injection is performed. The value of the predetermined pressure PTb thus set is stored in the external device in advance.

Subsequently, the regular injections are performed so as to drive the diesel engine 20 for a short time and then finished (step S22). The fuel injection amount for these regular injections is set relatively large. This process is executed in order to increase the engine speed NE up to a high speed temporarily.

Then, if the supercharging pressure PT becomes equal to the target supercharging pressure Tpt (step S23: YES), the rail pressure PR is adjusted to a predetermined pressure PRb, and a small amount of the reference fuel is injected to a predetermined one or more of the cylinders (preliminary fuel injection) and an engine torque increase $\Delta$tor caused by the preliminary injection is calculated and then recorded in the external device (step S24).

Figure 4:
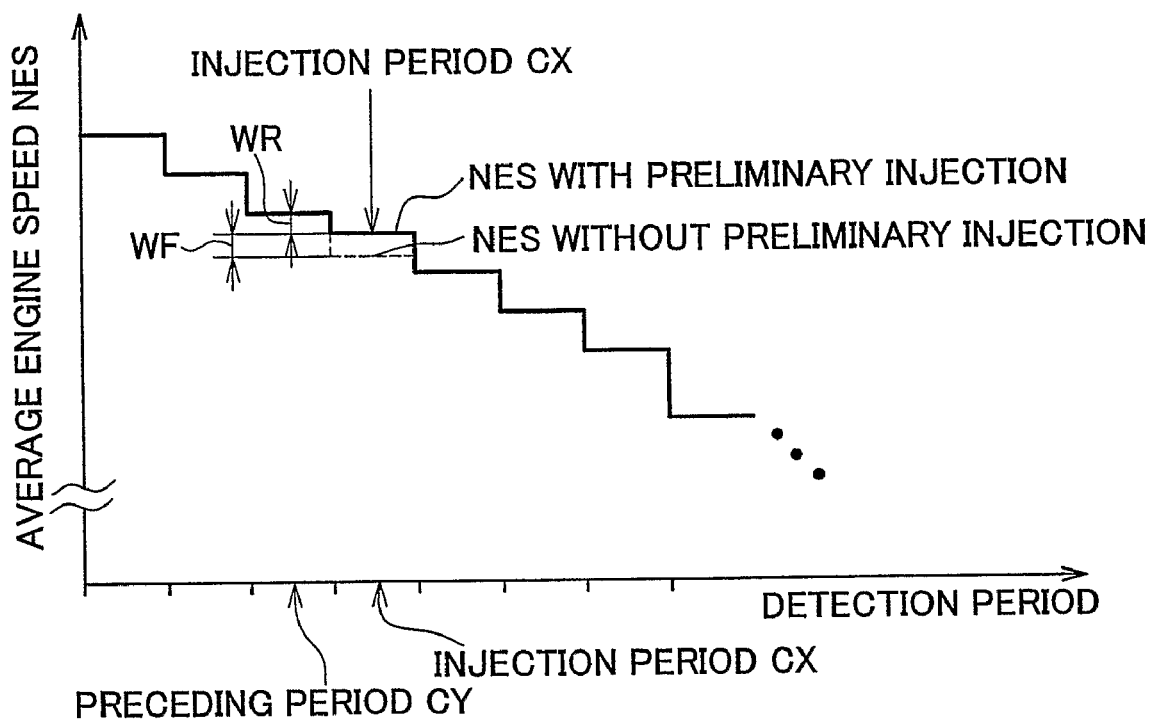
FIG. 4 is a graph illustrating an example of the relation between the respective detection periods and the average engine speeds according to the embodiment of the invention.

More specifically, first, a predetermined small amount of the reference fuel (2 mm$^3$ in the cetane number estimation method of the example embodiment) is injected as the preliminary injection. At this time, the combustion stroke at each cylinder of the diesel engine 20 is set as a detection period, and an average of the engine speed NE (average engine speed NES) is calculated in each detection period as shown in FIG. 4.

Then, a difference WR between the value of the average engine speed NES in the detection period corresponding to the combustion stroke on which the preliminary injection was performed (will be referred to as "injection period CX") and the value of the average engine speed NES in the detection period immediately before the injection period CX (will be referred to as "preceding period CY) is calculated. On the other hand, at this time, a difference WF between the value of the average engine speed NES in the injection period CX and the value of the average engine speed NES in the preceding period CY that are obtained on the assumption that the preliminary injection has not been performed is calculated. If the preliminary injection is not performed, the engine speed NE monotonously decreases. Therefore, the value of the engine speed NE in the injection period CX and the speed difference WF for the case where the preliminary injection is assumed not to have been performed can be easily estimated based on how the average engine speed NES had changed over the detection periods before the injection period CX. Then, the increase in the engine torque that has been caused by the preliminary injection is calculated based on the difference between the speed difference WR and the speed difference WF (will be referred to as "speed variation amount $\Delta$W).

Figure 5:
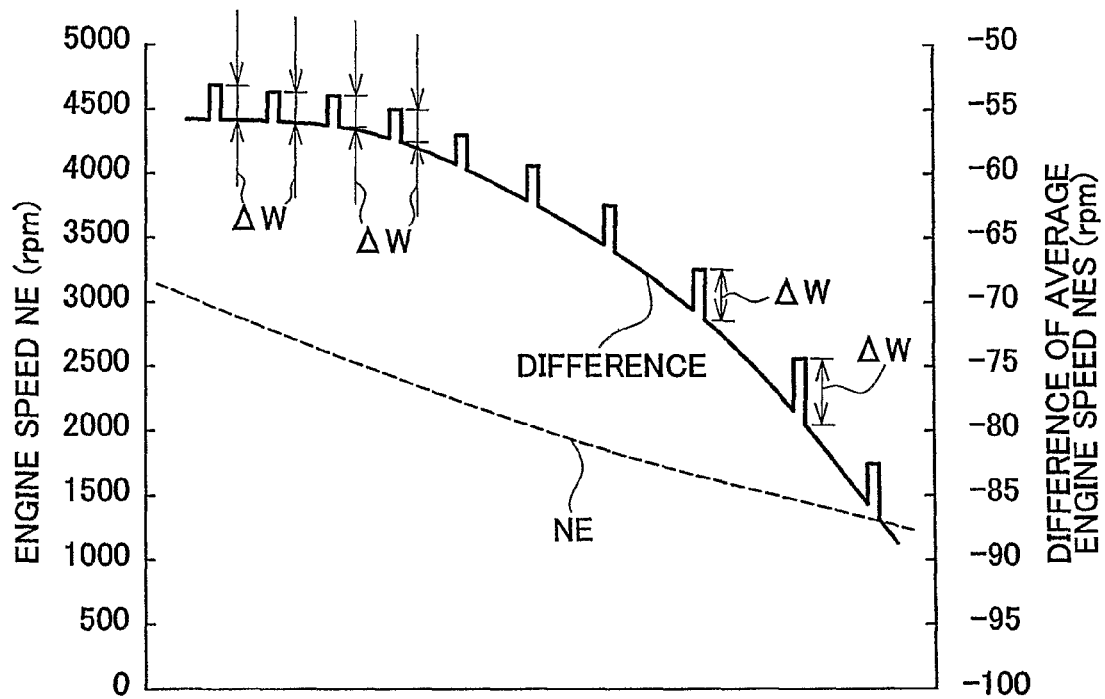
FIG. 5 is a graph illustrating an example of the relation between the engine speed and the difference of the average engine speed according to the embodiment of the invention.

In step S24, the above-described process for performing the preliminary injection and then calculating the resultant increase in the engine torque is executed multiple times (10 times in the cetane number estimation method of the example embodiment) at predetermined time intervals. The graph in FIG. 5 illustrates one example of the relation between the engine speed NE and the difference of the average engine speed NES. The average of the calculated engine torque increases is recorded as an engine torque increase $\Delta$tor corresponding to the compression end temperature at this time.

After the engine torque increase $\Delta$tor has been recorded as described above, it is then determined whether any misfire has occurred (step S25). At this time, if the engine torque increase $\Delta$tor is smaller than a predetermined value, it is determined that a misfire has occurred.

If it is determined in step S25 that any misfire has not occurred (step S25: NO), the target supercharging pressure Tpt is reduced by a predetermined value $\alpha$ (step S26), after which the processes in steps S22 to S25 are executed again. That is, in this case, the engine torque increase $\Delta$tor is calculated again at a lower compression end temperature.

Then, when it is determined that a misfire has occurred as the processes in steps S22 to S26 are repeated as described above (step S25: YES), the compression end temperature and the engine torque increase $\Delta$tor at a reference point on the relation therebetween are obtained, and the obtained compression end temperature and the obtained engine torque increase $\Delta$tor are recorded in the electronic control unit 18 as a basic compression end temperature Tbse and a basic engine torque increase $\Delta$torb (step S27).

Figure 6:
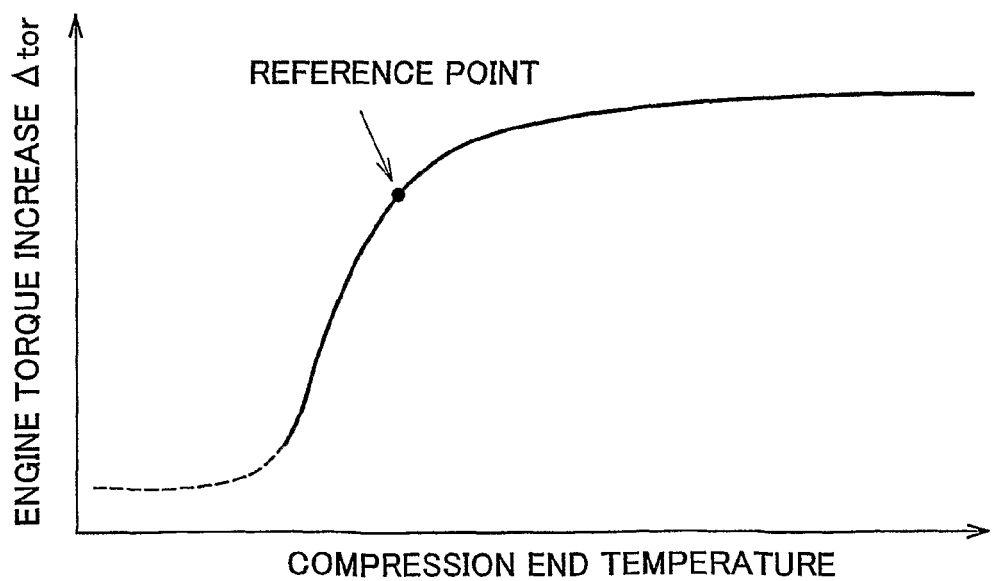
FIG. 6 is a graph illustrating an example of the relation between the compression end temperature and the engine torque increase according to the embodiment of the invention.

In the process of step S27, the compression end temperature at which misfires start to occur is estimated based on the tendency of change in the engine torque increase $\Delta$tor from the high compression end temperature side to the low compression end temperature side, and the point corresponding to the compression end temperature at which misfires start to occur is set as the aforementioned reference point. More specifically, referring to FIG. 6 showing an example of the relation between the compression end temperature and the engine torque increase $\Delta$tor, the compression end temperature at a point where the engine torque increase $\Delta$tor shapely changes (i.e., a point where the rate of decrease in the engine torque increase $\Delta$tor toward the low compression end temperature side is largest) is regarded as corresponding to the reference point.

As such, in the first process (i.e., the process for the engine torque increase detection before factory shipment), the preliminary injection is performed multiple times at different compression end temperatures, and the resultant engine torque increase $\Delta$tor is calculated each time, and the relation between the compression end temperature and the engine torque increase $\Delta$tor is then determined, and the values of the compression end temperature and the engine torque increase $\Delta$tor at the reference point on said relation are recorded in the electronic control unit 18, after which the first process is finished.

Figure 7:
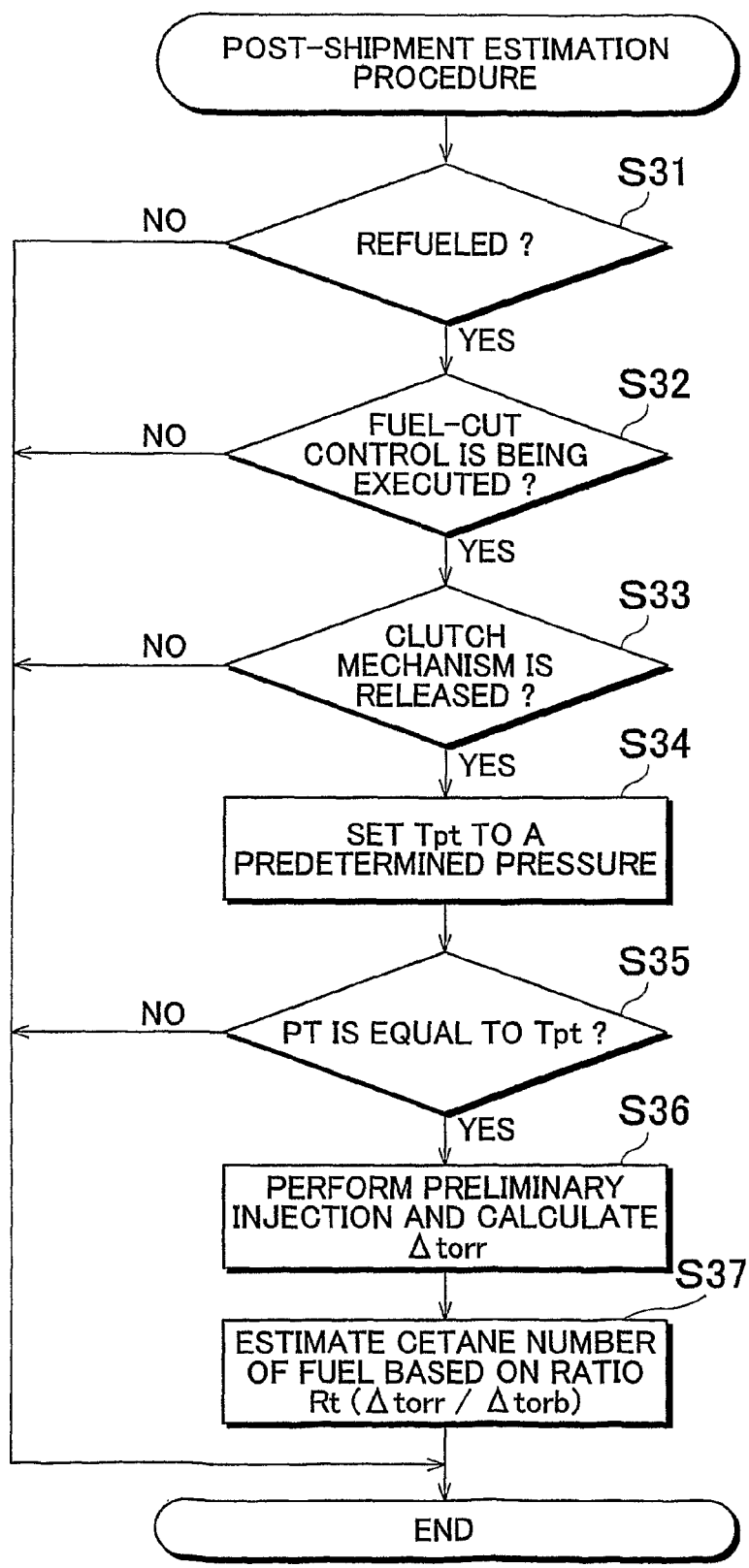
FIG. 7 is a flowchart illustrating a post-shipment estimation procedure according to the embodiment of the invention.

Next, a procedure implemented after factory shipment and including the second process (i.e., the process for the engine torque increase detection after factory shipment) and the third process (i.e., the process for the cetane number estimation) will be described with reference to FIG. 7. This procedure will be referred to as "post-shipment estimation procedure". The flowchart of FIG. 7 illustrates a routine for implementing the post-shipment estimation procedure. The processes of this routine are implemented through computations executed by the electronic control unit 18 at predetermined time intervals.

Referring to FIG. 7, in this routine, a preliminary injection is performed if the following three conditions are all in effect, and then an engine torque increase Δtorr caused by the preliminary injection is calculated (steps S34 to S36), and then the cetane number of the fuel presently in the fuel tank 26 is estimated based on the relation between the engine torque increase Δtorr and the basic engine torque increase Δtorb (step S37). The first condition is that the fuel tank 26 has been refueled (step S31: YES). More specifically, a refuel flag is "on". The refuel flag is used to determine whether the fuel tank 26 has been refueled after the last preliminary injection, and it is set to "on" when it is detected via the fuel amount sensor that the amount of fuel in the fuel tank 26 has increased, and it is set to "off" after the cetane number of the fuel presently in the fuel tank 26 has been estimated. The second condition is that fuel-cut control that suspends execution of the regular injection while the engine speed NE is decreasing is being executed (step S32: YES). More specifically, the engine speed NE is decreasing with the accelerator pedal 17 not depressed (accelerator operation amount ACC=0). The third condition is that the clutch mechanism 11 is released (in a decoupling state) (step S33: YES). More specifically, the clutch pedal 16 is being depressed.

Through steps S34 to S36, the preliminary injection is executed as follows. First, the target supercharging pressure Tpt is set to a predetermined pressure (a value corresponding to the basic compression end temperature Tbse) (step S34). In this step, the target supercharging pressure Tpt is set so as to bring the actual compression end value to the basic compression end temperature Tbse. Then, when the supercharging pressure PT equals the target supercharging pressure Tpt (step 35: YES), the rail pressure PR is adjusted to the predetermined pressure PRb and a preliminary injection is performed to a predetermined one or more of the cylinders of the diesel engine 20.

Then, the engine torque increase Δtorr caused by the preliminary injection is then calculated in the same manner as step S24 in the first process described above. That is, first, the preliminary injection is performed by injecting a predetermined small amount of fuel, and the speed difference WR between the value of the average engine speed NES in the injection period CX and the value of the average engine speed NES in the preceding period CY is calculated. At the same time, the speed difference WF between the value of the average engine speed NES in the injection period CX and the value of the average engine speed NES in the preceding period CY is calculated on the assumption that the preliminary injection has not been performed. Then, the engine torque increase Δtorr is calculated based on the difference between the speed difference WR and the speed difference WF, that is based on the speed variation amount ΔW.

Then, in step S37, a ratio Rt of the engine toque increase Δtorr to the basic engine torque increase Δtorb (=Δtorr/Δtorb) is calculated, and the cetane number of the fuel presently in the fuel tank 26 is estimated by applying the ratio Rt to a calculation map describing the relation between the ratio Rt and the fuel cetane number that has been empirically determined in advance.

Figure 8:
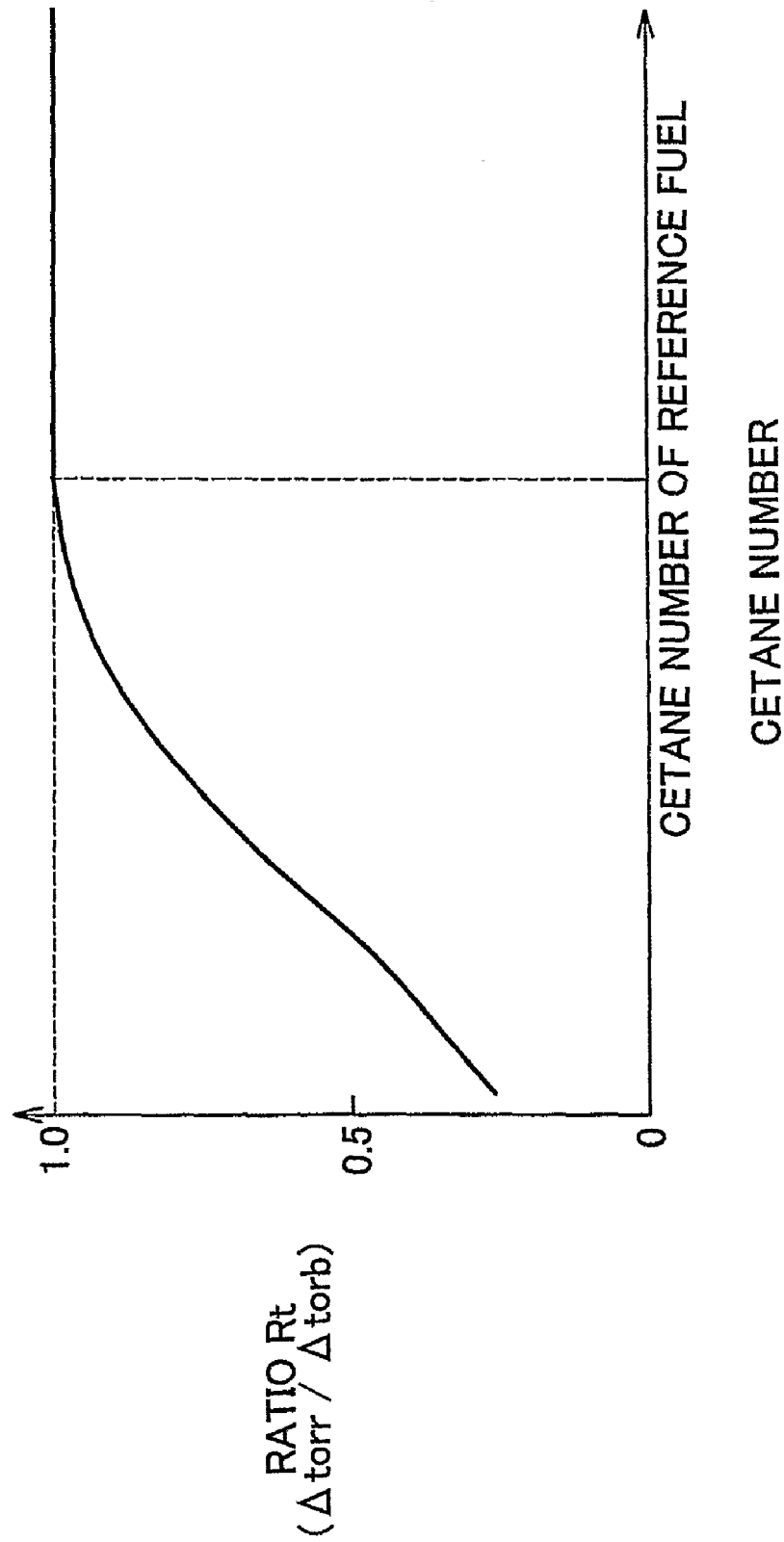
FIG. 8 is a graph illustrating the relation between a ratio recorded in a calculation map and the fuel cetane value according to the embodiment of the invention.

FIG. 8 illustrates the relation between the ratio Rt and the fuel cetane number described in the calculation map. Referring to FIG. 8, if the ratio Rt is equal to or higher than 1.0, the cetane number of the fuel presently in the fuel tank 26 is estimated to be equal to the cetane number of the reference fuel. On the other hand, if the ratio Rt is lower than 1.0, the cetane number of the fuel presently in the fuel tank 26 is estimated to be smaller than the ratio Rt.

In the cetane number estimation method of the example embodiment, based on the fuel cetane number estimated as described above, the above-described control target values used for the regular injections are corrected as follows. FIG. 9A to FIG. 9E each illustrate the relation between the fuel cetane number and each control target value.

Referring to FIG. 9A, a correction value for correcting the target injection time Tm for the main injections is calculated such that the smaller the cetane number of the fuel presently in the fuel tank 26, the earlier the target injection time Tm is made. As such, the smaller the cetane number of the fuel presently in the fuel tank 26 and thus the longer the ignition delay, the more the timing of the main injections is advanced, whereby the ignition delay is reduced reliably.

Referring to FIG. 9B, a correction value for correcting the target pilot injection amount Qpi is calculated such that the smaller the cetane number of the fuel presently in the fuel tank 26, the larger the target pilot injection amount Qpi is made. As such, the smaller the cetane number of the fuel presently in the fuel tank 26, the more the combustion of fuel injected through the main injection is activated by the preceding pilot injection, whereby an excessive ignition delay can be reliably prevented even if fuel having a small cetane number is used.

Referring to FIG. 9C, a correction value for correcting the pilot interval INTp is calculated such that the smaller the cetane number of the fuel presently in the fuel tank 26, the shorter the pilot interval INTp is made. As such, the interval between the timing of the pilot injection and the ignition timing of the fuel injected through the following main injection is prevented from being extended unnecessarily, and thus the fuel injected through the main injection can be properly ignited.

Referring to FIG. 9D, a correction value for correcting the target rail pressure Tpr is calculated such that the smaller the cetane number of the fuel presently in the fuel tank 26, the higher the target rail pressure Tpr is made. As such, the smaller the cetane number of the fuel presently in the fuel tank 26 and thus the more likely the combustion state is to be worse, the more the fuel injected through the main injection is diffused in each cylinder, facilitating the fuel and air to be mixed with each other and thereby shortening the ignition delay of the fuel. As such, even if fuel having a small cetane number is used, an excessive ignition delay of the fuel can be reliably prevented.

Referring to FIG. 9E, a correction value for correcting the target EGR rate Tegr is calculated such that the smaller the cetane number of the fuel presently in the fuel tank 26, the lower the target EGR rate Tegr is made. As such, the smaller the cetane number of the fuel presently in the fuel tank 26 and thus the more likely the combustion state is to be worse, the larger the amount of intake air drawn into each cylinder of the diesel engine 20 is made and thus the higher the compression end temperature is made, facilitating ignition of the fuel and preventing the combustion state from becoming worse.

In the following, the effects and advantages obtained through the above-described cetane number estimation will be described. According to the cetane number estimation method of the example embodiment, first, in the pre-shipment estimation procedure, the reference fuel having a predetermined cetane number is injected and the resultant increase in the engine torque (basic engine torque increase Δtorb) is determined and then recorded in the electronic control unit 18. Thereafter, in the post-shipment estimation procedure, the engine toque increase Δtorr is obtained by injecting the fuel stored in the fuel tank 26 at this time, and the relation between the engine toque increase Δtorr and the basic engine torque increase Δtorb (i.e., the ratio Rt) is obtained.

The smaller the cetane number of the fuel injected into the cylinders of the diesel engine 20, the smaller the resultant increase in the engine torque and the resultant increase in the engine NE provided that the amount of the injected fuel is constant. For this reason, the ratio Rt obtained as described above can be regarded as a parameter corresponding to the difference between the cetane number of the reference fuel supplied to the fuel tank 26 during the pre-shipment estimation procedure and the cetane number of the fuel presently in the fuel tank 26.

In the cetane number estimation method of the example embodiment, the relation between the ratio Rt and the fuel cetane number, such the one shown in FIG. 8, is empirically determined in advance and stored as the foregoing calculation map in the electronic control unit 18, and the cetane number of each fuel is estimated by applying the ratio Rt to said relation. According to the cetane number estimation method of the example embodiment, as such, the cetane number of the fuel presently in the fuel tank 26 can be accurately estimated based on the ratio Rt, that is, the relation between the engine torque increase that was caused by injecting the reference fuel having a predetermined cetane number (basic engine torque increase Δtorb) and the engine torque increase that was caused by injecting the fuel presently in the fuel tank 26 (engine torque increase Δtorr).

Even in a case where the preliminary injection is performed by injecting a constant amount of fuel, the resultant increase in the engine torque may vary depending upon the individual specificity of the diesel engine 20, such as the individual specificity of the fuel supply system 25 and so on, and such variation may cause an error in the cetane number estimation. In the diesel engine 20, the lower the compression end temperature at which fuel is injected, the smaller the resultant increase in the engine torque and the resultant increase in the engine speed NE provided that the amount of the injected fuel is constant.

In view of this, in the cetane number estimation method of the example embodiment, during the pre-shipment estimation procedure, the preliminary injection is performed multiple times at different compression end temperatures (steps S22 to S26 shown in FIG. 3), and the relation between the compression end temperatures for the respective preliminary injections and the resultant increases in the engine torque is determined, and then, the engine torque increase (engine torque increase Δtorb) at the reference point on the determined relation, which point is appropriate for the cetane number estimation, is recorded in the electronic control unit 18 as a reference value to be compared with an engine torque increase Δtorr that will be calculated in the post-shipment estimation procedure.

According to the cetane number estimation method of the example embodiment, as such, in the pre-shipment estimation procedure, the basic engine torque increase Δtorb reflecting the individual specificity of the diesel engine 20 and appropriate for the cetane number estimation is obtained and recorded in the electronic control unit 18, and then in the post-shipment estimation procedure, the cetane number of the fuel stored in the fuel tank 26 at this time is accurately estimated based on the basic engine torque increase Δtorb, that is, based on a value reflecting the individual specificity of the diesel engine 20.

On the relation determined in the pre-shipment estimation procedure (i.e., the relation between the compression end temperature and the engine torque increase Δtor), the engine torque increase Δtor tends to decrease significantly at the point at which misfires start to occur as the compressions end temperature decreases.

Thus, in the cetane number estimation method of the example embodiment, the compression end temperature at which misfires start to occur (i.e., the reference point described above) can be accurately estimated based on the tendency of change in the compression end temperature from one side to the other side, and therefore the compression end temperature and the engine torque increase at this reference point (the basic compression end temperature Tbse and the basic engine torque increase Δtorb) are appropriate. By estimating the cetane number of the fuel presently in the fuel tank 26 based on the basic compression end temperature Tbse and the basic engine torque increase Δtorb that are set as values corresponding to the cetane number of the reference fuel, a high accuracy can be achieved in the cetane number estimation.

As is evident from FIG. 6, the point at which misfires start to occur ("REFERENCE POINT" in the graph of FIG. 6) is an operation point where the rate of decrease in the engine torque tends to increase when fuel having a cetane number smaller than the cetane number of the reference fuel is used. Thus, by setting the above misfire-start point as the reference point, it is possible to ensure that the difference between the basic engine torque increase Δtorb and the engine torque increase Δtorr becomes large when fuel having a small cetane number is used. Thus, among the respective points on the relation described above, the misfire-start point can be said to be a point appropriate for the cetane number estimation.

In the cetane number estimation method of the example embodiment, because the processes for calculating and recording the basic compression end temperature Tbse and the basic engine torque increase Δtorb are executed in the pre-shipment estimation procedure, it is possible to accurately estimate the cetane number of fuel supplied to the fuel tank 26 after the vehicle 10 is shipped out from the factory.

According to the cetane number estimation method of the example embodiment, further, because the engine torque increase Δtorr is calculated on the condition that the fuel tank 26 has been refueled after the last preliminary injection, the cetane number estimation is performed only when there is a possibility that the cetane number of the fuel in the fuel tank 26 has changed, and therefore said estimation can be efficiently performed.

According to the example embodiment of the invention, because the basic compression end temperature Tbse, the basic engine torque increase Δtorb, and the engine torque increase Δtorr are calculated in a state where the regular injections are not performed, the calculations are not influenced by the regular injections, that is, the basic compression end temperature Tbse, the basic engine torque increase Δtorb, and the engine torque increase Δtorr can be accurately calculated.

According to the cetane number estimation method of the example embodiment, further, because the basic compression end temperature Tbse, the basic engine torque increase Δtorb, and the engine torque increase Δtorr are calculated in a state where the clutch mechanism 11 is released, the basic compression end temperature Tbse, the basic engine torque increase Δtorb, and the engine torque increase Δtorr can be accurately calculated without being influenced by the rotation states of the transmission 12, the drive shaft 14, and the drive wheels 15.

According to the cetane number estimation method of the example embodiment, the cetane number of the fuel presently in the fuel tank 26 can be accurately estimated based on the relation between the increase in the engine torque that was caused by injecting the reference fuel having a predetermined cetane number (basic engine torque increase $\Delta torb$) and the increase in the engine torque that was caused by injecting the fuel presently in the fuel tank 26 (engine torque increase $\Delta torr$). Further, the basic engine torque increase $\Delta torb$ can be set to a value reflecting the individual specificity of the diesel engine 20 and appropriate for the cetane number estimation and then recorded in the electronic control unit 18, and the cetane number of the fuel presently in the fuel tank 26 can be accurately based on the basic engine torque increase $\Delta torb$, that is, based on a value reflecting the individual specificity of the diesel engine 20.

Further, in the cetane number estimation method of the example embodiment, the compression end temperature at which misfires start to occur (i.e., the reference point described above) can be accurately estimated based on the tendency of change in the compression end temperature from one side to the other side, and therefore the values of the compression end temperature and the engine torque increase at this reference point (the basic compression end temperature Tbse and the basic engine torque increase $\Delta torb$) are appropriate. By estimating the cetane number of the fuel presently in the fuel tank 26 based on the basic compression end temperature Tbse and the basic engine torque increase $\Delta torb$ that are set as values corresponding to the reference cetane number, a high accuracy can be achieved in the cetane number estimation.

Further, on the tendency of the engine torque increase $\Delta tor$ on the relation between the compression end temperature and the engine torque increase $\Delta tor$, the point at which the engine torque increase $\Delta tor$ changes sharply is determined as the point at which misfires start to occur (the basic compression end temperature Tbse), and therefore the basic compression end temperature Tbse can be accurately determined.

Further, the cetane number estimation is performed after the vehicle 10 is shipped out from the factory. Further, the cetane number estimation is performed only when there is a possibility that the cetane number of fuel in the fuel tank 26 has changed, and therefore the efficiency of the cetane number estimation is high.

Further, the basic compression end temperature Tbse, the basic engine torque increase $\Delta torb$, and the engine torque increase $\Delta torr$ can be accurately calculated without being influenced by the regular injections. Further, the basic compression end temperature Tbse, the basic engine torque increase $\Delta torb$, and the engine torque increase $\Delta torr$ can be accurately calculated without being influenced by the rotation states of the transmission 12, the drive shaft 14, and the drive wheels 15.

The cetane number estimation method of the example embodiment may be modified as in the following examples. While the process for correcting the target injection time Tm based on the cetane number of the fuel presently in the fuel tank 26, the process for correcting the target pilot injection amount Qpi based on the cetane number of the fuel presently in the fuel tank 26, the process for correcting the pilot interval INTp based on the cetane number of the fuel presently in the fuel tank 26, the process for correcting the target rail pressure Tpr based on the cetane number of the fuel presently in the fuel tank 26, and the process for correcting the target EGR rate Tegr based on the cetane number of the fuel presently in the fuel tank 26 are executed in the cetane number estimation method of the example embodiment, these five processes are not necessarily all executed. That is, only one, two, three, or four of the processes may be executed.

During the post-shipment estimation procedure, the process for performing the preliminary injection then calculating the increase in the engine torque caused by said preliminary injection may be executed multiple times at given time intervals, and the average of the calculated engine torque increases may be used as the engine torque increase $\Delta torr$.

In the second process, while the preliminary injection is performed on the condition that the fuel tank 26 has been refueled after execution of the last preliminary injection during the post-shipment estimation procedure in the cetane number estimation method of the example embodiment, the preliminary injection may be performed every time the diesel engine 20 is started.

The cetane number estimation method of the example embodiment may be applied to a vehicle in which a torque converter with a lock-up clutch operable to connect the output shaft 21 of the diesel engine 20 to the input shaft 13 of the transmission 12 and interrupt said connection as needed is provided in place of the clutch mechanism 11. In this case, for example, the process for performing the preliminary injection and then calculating the increase in the engine torque caused by said preliminary injection in the second process is performed on the condition that the engine speed NE is decreasing and the fuel-cut control is being executed with the lock-up clutch released (or semi-released). In this case, the torque converter serves as a drive-force transfer mechanism that is switched between a state where the degree of drive-force transfer between the output shaft 21 of the diesel engine 20 and the input shaft 13 of the transmission 12 is large and a state where said degree is small.

In the second process, while the preliminary injection is performed on the condition that the engine speed NE is decreasing and the fuel cut is being performed in the cetane number estimation method of the example embodiment, it may be performed otherwise. For example, the preliminary injection may be performed when other condition indicating that the regular injections are not being performed is in effect. Further, if appropriate, the preliminary injection may be performed even when the regular injections are being performed, such as when the vehicle 10 is idling. In this case, preferably, the preliminary injection is performed in an operation region where changes in the engine torque caused by the regular injections are ignorable.

An operation switch may be provided in a vehicle compartment, and the electronic control unit 18 may be adapted to execute the process for calculating the engine torque increase $\Delta tor$ in response to the operation switch being turned on. The reference point may be set to any point on the relation between the compression end temperature and the engine torque increase $\Delta tor$ other than the misfire-start point as long as the cetane number of the fuel in the fuel tank 26 can be accurately estimated based on that reference point.

The method for calculating the engine torque increase $\Delta tor$ may be changed as needed. For example, the increase in the engine torque caused by the preliminary injection may be calculated using other parameters related to the combustion state of fuel, such as the pressure in each combustion chamber (combustion pressure).

Further, the increase in the engine speed NE caused by the preliminary injection may be calculated instead of the engine torque increase $\Delta tor$, and the cetane number of fuel in the fuel tank 26 may be estimated based on the calculated increase in the engine speed NE. In this case, more specifically, the cetane number of the fuel in the fuel tank 26 may be calculated as follows. First, in the pre-shipment estimation procedure, the relation between the compression end temperature and the variation of the engine speed NE (the speed variation amount $\Delta W$) is determined, and the value of the engine speed variation $\Delta W$ at a reference point on said relation is recorded as a basic engine speed variation $\Delta Wb$, and in the post-shipment procedure, an preliminary injection is performed, and the engine speed variation $\Delta W$ caused by the preliminary injection is obtained, and the cetane number of fuel is estimated based on the relation between the engine speed variation $\Delta W$ and the basic engine speed variation $\Delta Wb$.

The invention is not limited to applications in diesel engines having a variable-nozzle-vane type turbocharger, but the invention may be used to any diesel engine having a supercharging device that can variably control its supercharging pressure.

While the invention has been applied to a diesel engine mounted in a vehicle in the foregoing example embodiment of the invention, the invention may be applied to various other diesel engines, such as those for boats, ships, and the like.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

The invention claimed is:

1. A cetane number estimation method for estimating a cetane number of fuel combusted in a diesel engine in which a regular injection is performed by injecting fuel of an amount corresponding to an engine operation state and a preliminary injection is performed by injecting fuel of an amount predetermined for estimation of the cetane number of fuel, comprising:
    a first process in which the preliminary injection is preformed multiple times at different compression end temperatures with a fuel tank containing fuel having a predetermined cetane number, and an engine torque increase that has been caused by each preliminary injection is calculated and the relation between the compression end temperatures at the respective preliminary injections and the engine torque increases caused by the respective preliminary injections is determined, and the compression end temperature and the engine torque increase at a predetermined reference point on the relation are recorded in a data storage;
    a second process in which the preliminary injection is performed at the compression end temperature recorded in the data storage and an engine torque increase caused by the preliminary injection is calculated; and
    a third process in which a cetane number of fuel is estimated based on a relation between the engine torque increase recorded in the data storage and the engine torque increase calculated in the second process.

2. The cetane number estimation method according to claim 1, wherein
    in the first process, the compression end temperature at which misfires start to occur is estimated based on the tendency of change in the engine torque increase with respect to a change in the compression end temperature from one side to the other side of the relation and a point on the relation that corresponds to the estimated compression end temperature is set as the reference point.

3. The cetane number estimation method according to claim 2, wherein
    in the first process, a point on the relation at which the engine torque increase sharply changes is determined as the point at which misfires start to occur.

4. The cetane number estimation method according to claim 1, wherein
    the first process is implemented before the diesel engine is shipped out of a factory.

5. The cetane number estimation method according to claim 1, wherein
    the second process is executed on the condition that the fuel tank has been refueled after the preliminary injection was performed last time.

6. The cetane number estimation method according to claim 1, wherein
    the second process is executed each time the diesel engine is started.

7. The cetane number estimation method according to claim 1, wherein
    the first process and the second process are executed in a state where the regular injection is suspended.

8. The cetane number estimation method according to claim 7, wherein
    the second process are executed in a state where the regular injection is suspended while the speed of the diesel engine is decreasing.

9. The cetane number estimation method according to claim 1, wherein
    the first process and the second process are executed when an output shaft of the diesel engine and a driven shaft are disconnected from each other.

10. The cetane number estimation method according to claim 1, wherein
    a drive-force transfer mechanism is provided between the engine output shaft and a driven shaft and is switched between a state where the degree of drive-force transfer between the engine output shaft and the driven shaft is large and a state where the degree of drive-force transfer between the engine output shaft and the driven shaft is small, and
    the first process and the second process are executed when the drive-force transfer mechanism is in the state where the degree of drive-force transfer between the engine output shaft and the driven shaft is small.

11. A cetane number estimation method for estimating a cetane number of fuel combusted in a diesel engine in which a regular injection is performed by injecting fuel of an amount corresponding to an engine operation state and a preliminary injection is performed by injecting fuel of an amount predetermined for estimation of the cetane number of fuel, comprising:
    a first process in which the preliminary injection is preformed multiple times at different compression end temperatures with a fuel tank containing fuel having a predetermined cetane number, and an increase in the rotation speed of an engine output shaft that has been caused by each preliminary injection is calculated and a relation between the compression end temperatures at the respective preliminary injections and the engine output shaft speed increases caused by the respective preliminary injections is determined, and the compression end temperature and the engine output shaft speed increase at a predetermined reference point on the relation are recorded in a data storage;

a second process in which the preliminary injection is performed at the compression end temperature recorded in the data storage and an engine output shaft speed increase caused by the preliminary injection is calculated; and a third process in which a cetane number of fuel is estimated based on a relation between the engine output shaft speed increase recorded in the data storage and the engine output shaft speed increase calculated in the second process.

12. The cetane number estimation method according to claim 11, wherein in the first process, the compression end temperature at which misfires start to occur is estimated based on the tendency of change in the engine output shaft speed increase with respect to a change in the compression end temperature from one side to the other side of the relation and a point on the relation that corresponds to the estimated compression end temperature is set as the reference point.

13. The cetane number estimation method according to claim 12, wherein in the first process, a point on the relation at which the engine output shaft speed increase sharply changes is determined as the point at which misfires start to occur.

14. The cetane number estimation method according to claim 11, wherein the first process is implemented before the diesel engine is shipped out of a factory.

15. The cetane number estimation method according to claim 11, wherein the second process is executed on the condition that the fuel tank has been refueled after the preliminary injection was performed last time.

16. The cetane number estimation method according to claim 11, wherein the second process is executed each time the diesel engine is started.

17. The cetane number estimation method according to claim 11, wherein the first process and the second process are executed in a state where the regular injection is suspended.

18. The cetane number estimation method according to claim 17, wherein the second process are executed in a state where the regular injection is suspended while the speed of the diesel engine is decreasing.

19. The cetane number estimation method according to claim 11, wherein the first process and the second process are executed when an output shaft of the diesel engine and a driven shaft are disconnected from each other.

20. The cetane number estimation method according to claim 11, wherein a drive-force transfer mechanism is provided between the engine output shaft and a driven shaft and is switched between a state where the degree of drive-force transfer between the engine output shaft and the driven shaft is large and a state where the degree of drive-force transfer between the engine output shaft and the driven shaft is small, and the first process and the second process are executed when the drive-force transfer mechanism is in the state where the degree of drive-force transfer between the engine output shaft and the driven shaft is small.

* * * * *